US006981587B2

(12) United States Patent
Gerrie

(10) Patent No.: US 6,981,587 B2
(45) Date of Patent: Jan. 3, 2006

(54) COMPACT DISK MAILER AND FILE FOLDER

(75) Inventor: William Gerrie, Webster, NY (US)

(73) Assignee: Omnifile, Inc., Rochester, NY (US)

(*) Notice: Subject to any disclaimer, the term of this patent is extended or adjusted under 35 U.S.C. 154(b) by 124 days.

(21) Appl. No.: 10/636,473

(22) Filed: Aug. 7, 2003

(65) Prior Publication Data

US 2005/0029135 A1 Feb. 10, 2005

(51) Int. Cl.
    *B65D 85/57* (2006.01)
(52) U.S. Cl. .................. 206/232; 206/308.1; 206/312; 206/309; 229/72
(58) Field of Classification Search ............. 206/308.1, 206/307, 311–312, 313, 232, 303; D6/407; 229/67.1, 305, 72
See application file for complete search history.

(56) References Cited

U.S. PATENT DOCUMENTS

| 922,891 | A | * | 5/1909 | Harker ......................... 229/72 |
| 970,399 | A | * | 9/1910 | Sawyer ......................... 281/48 |
| 2,097,916 | A | * | 11/1937 | Elmore ......................... 229/72 |
| 3,381,888 | A | * | 5/1968 | Lewis, Jr. ..................... 229/72 |
| 4,850,731 | A | * | 7/1989 | Youngs ................... 206/308.1 |
| 5,147,036 | A | * | 9/1992 | Jacobs ........................ 206/232 |
| 5,333,728 | A | | 8/1994 | O'Brien |
| 5,460,265 | A | * | 10/1995 | Kiolbasa .................. 206/308.1 |
| 5,641,063 | A | * | 6/1997 | Gambardella et al. ...... 206/312 |
| 5,749,463 | A | * | 5/1998 | Collins .................... 206/308.1 |
| 5,775,490 | A | * | 7/1998 | Baker et al. ............. 206/308.1 |
| 6,016,907 | A | | 1/2000 | Dreler |
| 6,398,024 | B2 | * | 6/2002 | Koehn ..................... 206/308.1 |

* cited by examiner

Primary Examiner—Jila M. Mohandesi
(74) Attorney, Agent, or Firm—Stephen B. Salai, Esq.; Roger Aceto, Esq.; Harter, Secrest & Emery LLP

(57) ABSTRACT

A CD mailer and pocket file, the pocket file having a two-ply front wall and a single ply rear wall. The two-ply wall has a slot in one of the plies to receive a CD into a CD retaining recess between the plies. A mailer flap connected to one of the walls along a fold line is folded over the two-ply wall to close the open end of the pocket and cover the CD receiving slot for mailing.

11 Claims, 3 Drawing Sheets

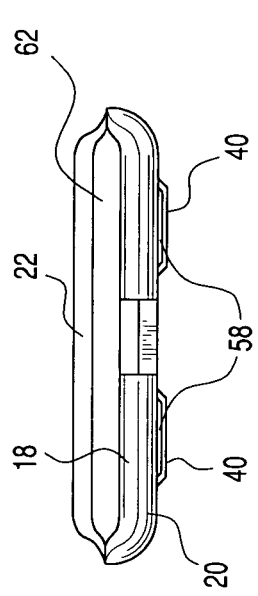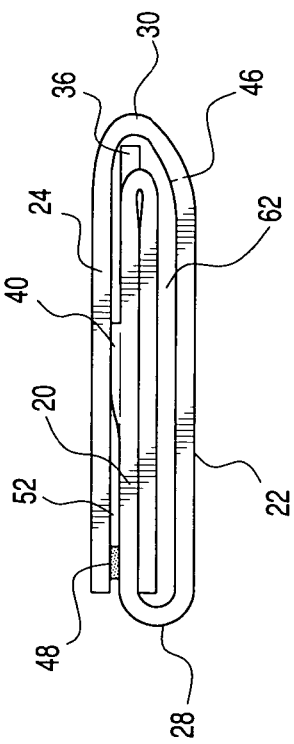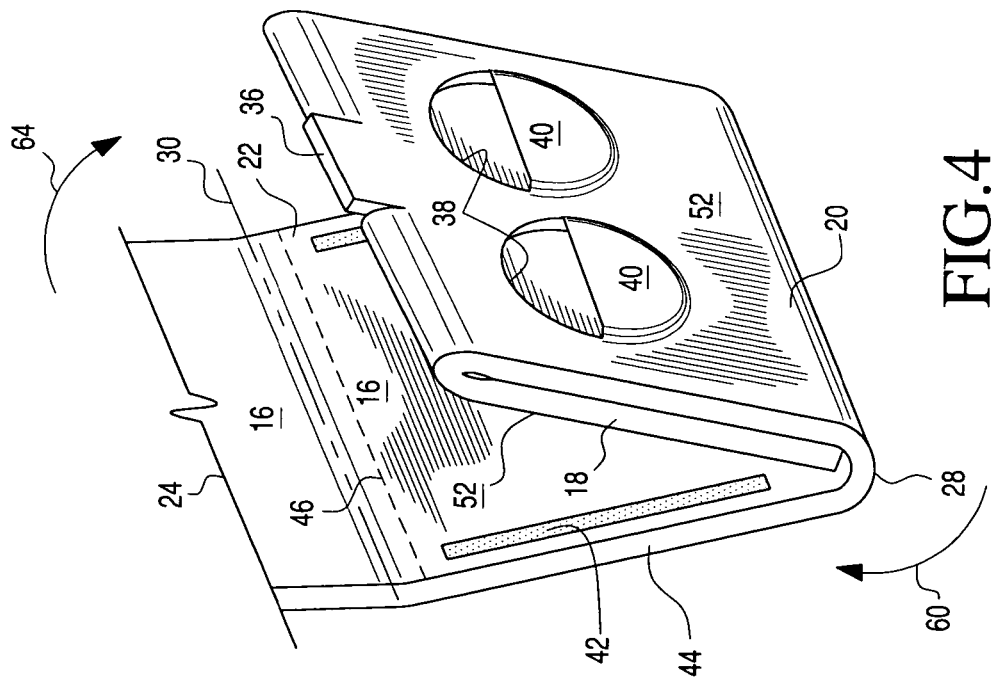

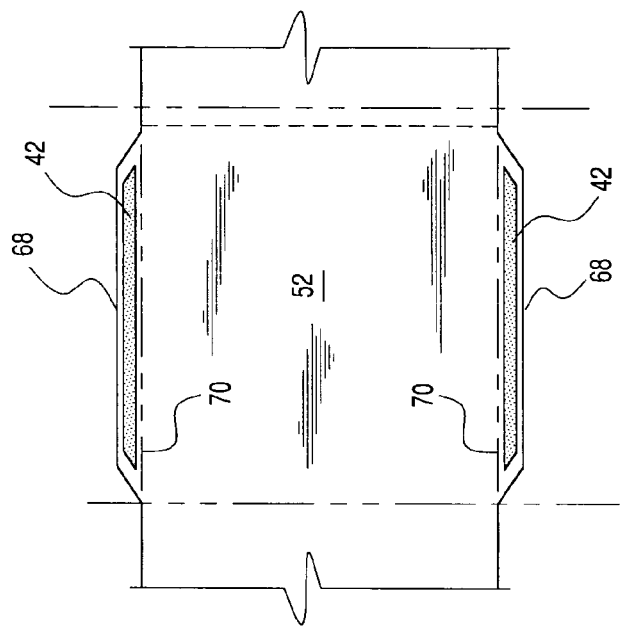
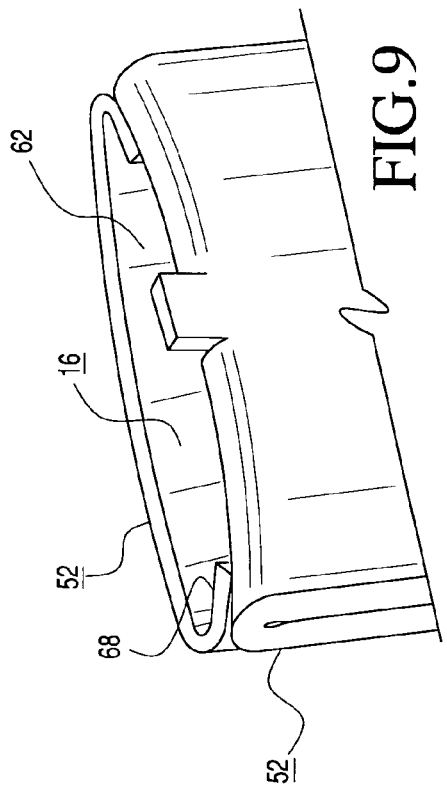
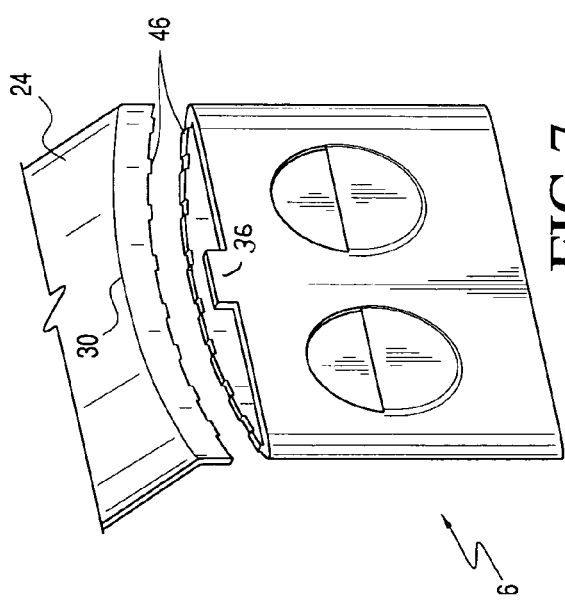

COMPACT DISK MAILER AND FILE FOLDER

BACKGROUND OF THE INVENTION

Field of the Invention

The present invention relates to a mailer for compact disks and more particularly, to a compact disk mailer that include an integral file folder.

Compact disks, DVD disks and the like containing a software program, photographs, music, video or other stored digital data are often sent through the mails. The mailers for such disks usually comprise a generally square or rectangular paperboard envelope having a slot for receiving the disk and a closure flap which folds over the slot to seal in the disk.

The mailer often is used to store the disk and the inside surface of the closure flap can contain operational instructions or other information pertinent to the digital information on the disk. The flap surface also can contain blank space where the user can hand record information identifying the disk or its contents. Generally, however, space on the mailer is limited and there is little room for instructional material or for recording information.

Accordingly, it is an object of the present invention to provide an improved compact disk mailer.

Another object is to provide an improved compact disk mailer that includes storage for printed instruction or other information relevant to the digital information stored on the disk being mailed.

A further object is to provide a mailer including a holder for at least one compact disk and file folder associated with the disk holder for storage of printed or written information.

BRIEF SUMMARY OF THE INVENTION

In the present invention, a compact disk mailer is provided that includes room for the storage or papers and the like in addition to the compact disk itself. In this respect, the mailer has a pocket for accommodating the disk and an attached file folder for receiving other materials such as printed instructions, drawings, photographs or other papers that may have a relationship to the digital information contained on the disk. A mailer panel is foldable over both the compact disk pocket and file folder and is sealed for mailing. The mailing panel thereafter may be separated and discarded by the user leaving only the compact disk holder and attached file folder for storage in the drawer of a conventional filing cabinet.

In a preferred embodiment, the invention includes an elongated blank made of paperboard or any other suitable material that can be cut and scored to form foldable panels. Four such generally rectangular panels are formed in the blank by transverse fold lines made by scoring the blank. A first and second of the panels are folded together to form a double ply wall with a pocket therebetween for holding a compact disk. Access to the pocket is provided by a slit in one of the panels.

These two panels, in turn, are connected by a fold line to a third panel. The third panel folds and attaches to the double ply wall for forming the pocket of a file folder between the third panel and the double ply wall. A fourth panel that connects to the third panel at another fold line is folded over and is sealed to the double ply wall for mailing. Preferably, a separation line such as a line of perforation is provided across the fourth panel. This allows separation and removal of the fourth panel after mailing thereby leaving only the compact disk holder and attached file folder.

The construction provides a folder having front and back walls wherein either wall has at least two plies. The space between the walls defines a file folder pocket having an opening at one end for inserting materials into the file folder. The double ply construction of one of the folder walls allows for the insertion of a disk into a recess or pocket between the plies through a slot in one of the plies. A mailer panel that is foldably attached along an edge of one of the walls is arranged to fold over both the open end of the file folder and the disk access slot to close the folder for mailing. A separation line allows the mailer panel to be removed and discarded after receipt of the folder.

Accordingly, the present invention may be characterized in one aspect thereof by a compact disc mailer and file folder comprising:

a) a file folder having a front wall and a back wall defining a materials-receiving file pocket therebetween having an open top end and a closed bottom, one of the front and back walls formed of two plies, one of the plies having a slot providing access to a disk retaining recess between the plies; and b) a mailer panel attached along a fold line to one or another of the front and back walls of the file folder, the mailer panel being foldable over the open top of the file folder to close the folder for mailing.

In another aspect, the present invention may be characterized by a blank cut and scored for folding to form a compact disk mailer and file folder, the blank comprising:

a) first and second panels foldable along a first fold line to form a double ply wall comprising one wall of a file folder, one of the panels having a slot to provide access to a compact disk receiving recess between the two plies;

b) a third panel foldable along a second fold line to form a second wall of the file folder wherein the second fold line defines a closed bottom of the file folder; and c) a fourth panel that is foldable along the third fold line to provide a mailer panel that is foldable over the file folder for mailing.

BRIEF DESCRIPTION OF THE SEVERAL VIEWS OF THE DRAWINGS

FIG. 4 is a perspective view showing partial completion of a second step in forming the disc mailer and file folder;

FIG. 5 is a top plan view, on a smaller scale showing the compact disk mailer and file folder after completion of the partial step shown in FIG. 4;

FIG. 6 is a schematic view showing the arrangement of the plies of the completed compact disk mailer and file folder ready for mailing;

FIG. 7 is a perspective view showing separation of a protective mailer flap from the remaining portion of the invention;

FIG. 8 is a view similar to FIG. 1 only showing another embodiment of the blank of the present invention; and FIG. 9 is a perspective view showing a compact disk mailer and file folder made from the blank of FIG. 8 and with a protective mailing flap removed as in FIG. 7.

DETAILED DESCRIPTION OF THE INVENTION

Figure 1:
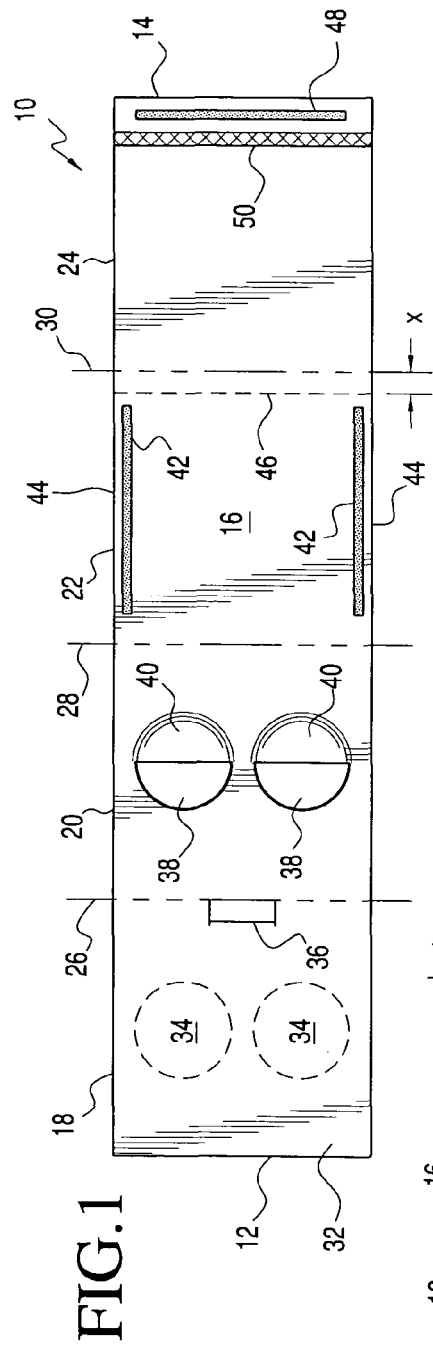
FIG. 1 shows a blank for making a compact disk mailer and file folder according to one embodiment of the present invention.

Referring to the drawings, FIG. 1 shows a blank of the present invention generally indicated at 10. The blank is made of paperboard or any other rigid or semi-rigid material such as a composite, plastic or corrugated cardboard that can be die cut and scored for folding. The blank is elongated having free ends 12, 14 at opposite ends of the blank. For purposes of orientation, the obverse surface 16 of the blank is shown in FIG. 1.

The blank is divided into four panels 18, 20, 22 and 24 by three transverse fold lines 26, 28 and 30. The fold lines preferably are scored to facilitate the folding the panels one relative to another as set out herein below. Preferably the scores are such that the panels all easily fold in the same direction. The first panel 18 includes the first free end 12 and is about equal in size to the second panel 20. The third and fourth panels 22, 24 each are slightly longer to facilitate folding along the fold lines as described herein below.

A portion of the surface of the first panel 18 has an adhesive coating 32. The adhesive coating is applied so as to leave at lease one and preferably two circular adhesive-free areas 34. In addition, three orthogonal die cuts made in the first panel adjacent the fold line 26 form the sides of a file tab 36. The area of the file tab also is adhesive free. When the panels are folded, the file tab will comprise a portion of the second panel 20 that extends out from the fold line.

The second panel also is die cut to remove one and preferably two semicircular sections 38. Directly below the semicircular cutout sections 38 are semicircular sections 40 that are embossed from the obverse surface of the blank so the embossed semicircular sections 40 extend slightly out from the plane of the opposite surface of the blank (the reverse surface). As further described herein below the adhesive free areas 34 of the first panel coincide with the circular areas defined on the second panel by combination of the semicircular sections 38 and 40. As an alternative, the adhesive coating 32 may be applied to the second panel 20 about the circular areas defined by the semicircular cut outs 38 and embossed areas 40.

The third panel 22 has adhesive strips 42 along each side edge 44 of the panel. The third panel also has a transverse tear line 46. The tear line can be formed by a line of perforations or other weakness in the material of the blank so that the blank can be torn along this line. The tear line is located a distance "x" from the fold line 30, this distance being at least equal to the height of the file tab 36 as measured from the fold line 26.

Completing the structure is the fourth panel 24, which is a mailer panel or flap used in the mailing of a compact disk and file folder. In this respect the fourth panel has an adhesive strip 48 adjacent the free edge 14 and an easy open means such as a tear strip 50 just inboard of the adhesive strip.

Figure 2:
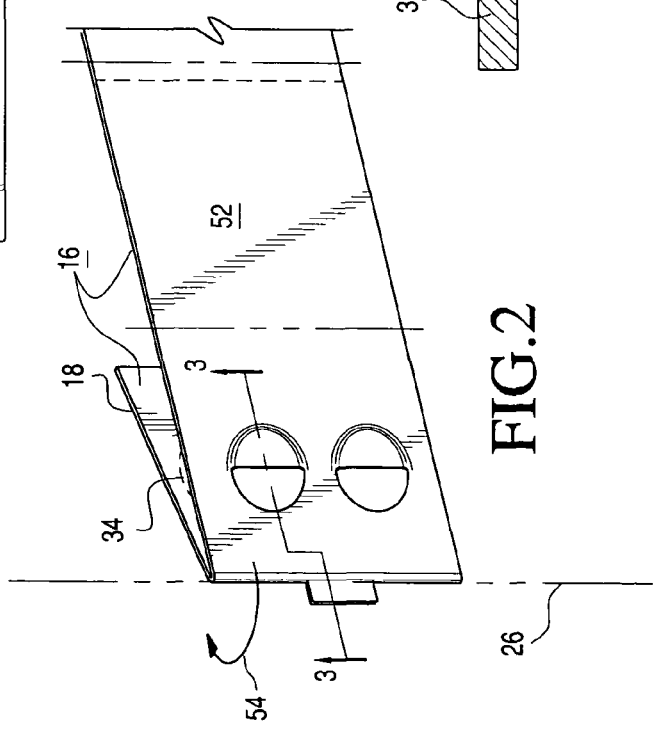
FIG. 2 shows a first step in the converting the blank of FIG. 1 to a compact disk mailer and file folder.

The formation of a compact disk mailer and file folder from the blank 10 is described beginning with FIG. 2. FIG. 2 shows the reverse surface 52 of the blank. As a first step, the first panel 18 is folded along fold line 26 in the direction of arrow 54. The folding superimposes the portions of the blank obverse surface 16 defined by the first panel and second panels 18, 20 one against the other.

Figure 3:
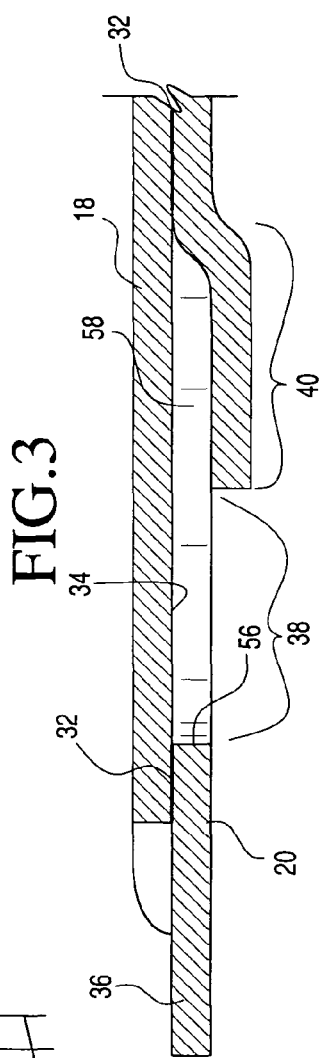
FIG. 3 is a view taken generally along lines 3—3 of FIG. 2 showing a portion of the structure on a larger scale after the completion of the first step.

As best seen in FIG. 3, the adhesive 32 coating adheres the two panels together except in the circular areas defined by the adhesive free areas 34 that extend around the semicircular cutouts and embossed sections 38, 40 respectively. The result is that the first and second panels 18, 20 form a double ply wall having a circular recess 56. The recess includes a semicircular pocket 58 as defined between the embossed section 40 and the first panel 18 wherein access to the pocket is through a slit defined by the semicircular cutout section 38 in the second panel 20.

In a next step as illustrated in FIG. 4, the double ply wall formed by the superimposed first and second panels 18, 20 is folded along the second fold line 28 in the direction shown by arrow 60. This folding superimposes the portion of the blank obverse surface 16 defined by the third panel 22 and the portion of the blank reverse surface 52 defined by the first panel 18. Adhesive strips 42 then seal each side edge 44 of the third panel 22 to the first panel. The result as shown in FIG. 5 is that the third panel 22 and first panel 18 form a file folder pocket 62 therebetween. More particularly, a file folder including pocket 62 is defined by a double ply front wall (the adhered first and second panels 18, 20) and a single ply rear wall (the third panel 22). The end of the file folder opposite the fold line 28 is open, the fold line 28 defines the closed bottom of the file folder and the side edges of the file folder are closed by the adhesive strips 44 sealing together the side edges of the first and third panels.

To use the compact disk mailer and file folder of the present invention, the user first inserts a compact disk (not shown) through a cutout 38 and into a pocket 58 so the disk is retained in a circular recess 56 between the first and second panels 18, 20 respectively. The fourth panel or mailing flap 24 then is folded along fold line 30 in the direction of arrow 64 (FIG. 4) so it overlies the second panel and any disk retained in a recess 56. As shown in FIG. 6, the adhesive strip 48 is used to seal the mailing flap 24 to the reverse surface 52 of the second panel 20. The fourth panel or mailing flap 24 thus protects and retains a disk in the recess. The fourth panel also folds over the opening of the pocket 62 of the file folder so any item or sheet of paper is retained in the pocket during mailing.

When the sealed article is received in the mail, the recipient uses the tear strip 50 to release the mailer flap (fourth panel 24) from the second panel 20 so the disk mailer can be opened. This provides access to both the compact disks retained in the recesses 56 as well as providing access to the contents of the file folder pocket 62. The recipient then can tear the mail flap 24 along the tear line 46 as shown in FIG. 7. This allows the mailer flap to be removed and discarded at the option of the recipient. When the flap is torn away, there remains a combination compact disk retainer and a file folder unit generally indicated at 66 having a file tab 36 extending from the top of the file for receiving a contents identifier.

In the arrangement as shown the front wall of the file folder is the double ply wall having a recess for holding a compact disk and the back wall of the folder has a single ply. Also, in the embodiment as shown, compact disks are stored or retained on a outwardly facing surface of the front wall and the pocket of the file folder for the storage of papers or other materials associated with the disks is behind the disks. However by folding the third panel in a direction opposite to arrow 60 (FIG. 4), the double ply wall will comprise a back wall of the folder and the panel 22 will form a single ply front wall of the folder. Also, where the double ply wall is a back wall of the folder, the compact disks are stored or retained on a surface that faces inward into the folder.

A slightly different embodiment is shown in FIGS. 8 and 9. In this respect, the adhesive strips 42 of FIG. 1 are moved outboard of the third panel to wings 68 that extend out from opposite sides of the third panel 22 (FIG. 8). In particular the strips are located on the surface of the wings comprising a portion of the reverse surface 52 of the blank. These wings then are folded along lines 70 so the tabs are adhered to the reverse surface 62 of the first panel 18 (FIG. 9). This construction allows increases the volume of the file folder.

It should be appreciated that various modifications may be made without departing from the spirit and scope of the invention as claimed. For example, as noted above, panels 18 and 20 may be folded opposite to the directions shown so that the reverse surfaces 52 of each panel are laid one against the other. This will locate the disk holding recesses on an inward facing surface of the file folder. In a further modification, the semicircular cut outs and embossed areas can be provided on the front panel 18 and cuts made in the second panel 20 to form the file tab 36. With this arrangement, following the folding sequence shown in FIG. 4 locates the disk holding recesses 56 in a double ply rear wall of the file folder.

The wings 68 on the third panel 22 can comprise a pleated structure so that the file folder is expandable to accommodate a greater amount of material. It also is within the skill of the art to extend the length of the fourth panel so as to provide a foldable portion containing the adhesive strip 48 and tear strip 50. It also is apparent that there are other folding schemes available to provide the double and single ply walls of the compact disk mailer and file folder as described herein.

Thus, it should be appreciated that the present invention accomplishes it intended objects in providing an improved compact disk mailer including both a retainer for one or more compact disks as well as storage for printed instruction or other information relevant to the digital information stored on the disks. The invention further provides a mailer including a holder for at least one compact disk and a file folder associated with the disk holder for storage of printed or written information.

What is claimed is:

1. A compact disk mailer and file folder comprising:
   a) a file folder having a front wall and a back wall defining a materials-receiving pocket therebetween having an open top end, closed opposite sides and a closed bottom, one of the front and back walls being a two ply wall formed of superimposed inner and outer plies adhered together by an adhesive extending over substantially the entire surface between the two plies except for at least one adhesive-free area defining a disk receiving recess between the inner and outer plies, one of the plies having a slot therein providing the sole access to the disk retaining recess between the plies;
   b) a mailer panel attached along a fold line to one or another of the front and back walls of the file folder, the mailer panel being foldable over the open top to close the pocket for mailing; and
   c) the two ply wall is a front wall of the folder and the back wall has outward extending wing portions connected along fold lines to each side edge of the back wall, the wings being folded inward and adhered to the front wall to form the two closed opposite sides.

2. A compact disk mailer and file folder as in claim 1 wherein one of the inner and outer plies has a semicircular opening and the diameter of the opening defines the slot.

3. A compact disk mailer and file folder as in claim 1 wherein one of the inner and outer plies has an embossed portion that stands out from the other of the plies to form the disk retaining recess between the plies.

4. A compact disk mailer and file folder as in claim 3 wherein embossed portion is at least semicircular.

5. A compact disk mailer and file folder as in claim 1 wherein one of the inner and outer plies has two laterally spaced semicircular openings and the diameter of each opening defines a slot, each slot providing the sole access to a separate disk retaining recess between the plies.

6. A compact disk mailer and file folder as in claim 1 wherein one of the front and rear walls includes a file tab extending out from a top edge of the wall adjacent the top of the pocket.

7. A compact disk mailer and file folder comprising:
   a) a file folder defined by a single ply rear wall and a double ply front wall, the walls being superimposed to lie flat one against another and the walls being connected along three edges so as to leave one end open for access to a pocket of the file folder as defined between the single ply rear wall and an inner ply of the double ply front wall;
   b) an outer ply of the front wall having at least one slot providing sole access to a compact disk receiving recess disposed wholly between the inner and outer plies;
   c) a mailer panel comprising an extension of the single ply rear wall, the mailer panel being foldable along a transverse fold line over the open end so as to lay flat against the front wall outer ply thereby closing the file folder open end and covering the slot in the outer ply; and
   d) means associated with one of the front wall outer ply and mailing panel for sealing the mailing panel to the outer ply.

8. A compact disk mailer and file folder as in claim 7 wherein the outer ply as an embossed semicircular section standing out from the plane of the outer ply to form the disk receiving recess between the plies, the diameter of the semicircular section defining the slot.

9. A compact disk mailer and file folder as in claim 7 wherein the two plies of the front wall are bound together by an adhesive that extend over the entire surface between the two plies except for a circular adhesive-free area defining the disk receiving recess.

10. A compact disk mailer and file folder as in claim 7 wherein one of the rear wall and mailer panels having a line of weakness to permit separation of the mailer panel from the file folder.

11. A compact disk mailer and file folder as in claim 7 wherein one of the front and rear walls includes a file tab extending out from a top edge of the wall adjacent the open end of the pocket.

* * * * *